United States Patent Office

3,299,175
Patented Jan. 17, 1967

3,299,175
VULCANIZING OF OLEFIN COPOLYMERS
Gerolamo Marchesini, Milan, and Michele Manica, Ferrara, Italy, assignors to Pirelli S.p.A., & Montecatini Edison S.p.A., Milan, Italy
No Drawing. Filed June 21, 1963, Ser. No. 289,746
Claims priority, application Italy, June 26, 1962, 12,814/62
13 Claims. (Cl. 260—876)

The present invention relates to vulcanizable olefin copolymer compositions, to a process for effecting their vulcanization, and to the articles obtained thereby. Vulcanized articles of particular interest include electric cables and other manufactured articles to be used in electrical applications, which articles are elastic, have a high resistance to ozone and to the corona effect, and which are particularly suitable for use in fields wherein average and high voltages are encountered.

It is known that elastic materials to be employed in electrical applications wherein average and high voltages are encountered (e.g., electric cables, insulating materials, gaskets, insulating joints and terminals, etc.) must conform to particularly severe requirements as regards their electrical characteristics.

They must in fact have:

(1) A high insulating constant,
(2) Reduced dielectric losses,
(3) A low dielectric constant,
(4) A high resistance to ozone, and
(5) A high resistance to ionization, and these characteristics must remain unaltered with time and not be sensitive to humidity. The manufactured articles also should have a certain degree of mechanical strength, desirably should be economical, and should be easily obtained from mixtures which can be processed using the conventional equipment of the rubber industry.

The most economical rubbery materials used heretofore are not suitable for use in those fields wherein average and high electric voltages are encountered, since such materials exhibit a poor resistance to ozone and to the effects of ionization. This is essentially due to the unsaturated nature of conventional natural and synthetic elastomers.

Elastomers of a new type have recently been disclosed which are characterized by a very high resistance to ozone and which have very good electrical characteristics due to their essentially saturated amorphous nature. These elastomers are copolymers of ethylene with alpha-olefins, and particularly, copolymers of ethylene with propylene or butene-1. Such copolymers are obtained by using certain specific catalytic systems obtained from a hydrocarbon-soluble transition metal compound, preferably a vanadium compound, and a metallorganic aluminum compound, particularly aluminum trialkyls and aluminum alkyl halides.

These copolymers possess to a high degree all of the aforementioned desirable electrical characteristics needed for use in the fields of average and high voltages. However, these copolymers have rather poor mechanical characteristics, and, as in the case of most synthetic rubbers, require the use of reinforcing agents. These reinforcing agents have included either conventional mineral fillers well known in the field of rubber or agents made from monomeric or polymerized organic compounds. For instance, processes have been disclosed in which saturated copolymers are vulcanized with peroxides, preferably in the presence of sulfur, by incorporating in the mixtures monomers or polymers containing vinyl unsaturations.

In all of these cases, an actual reinforcing is obtained, with a corresponding improvement in the mechanical characteristics. The mixture often shows a poor workability, i.e., difficult processing characteristics so that it is difficult to obtain the desired manufactured article therefrom, especially more or less complex shapes wherein extrusion, injection, molding, calendering, etc. are required.

It is known that in order to improve the processability of mixtures of synthetic rubbers, relatively appreciable amounts of mineral fillers which exert a reinforcing action may be incorporated into the mixtures. These include the various types of carbon blacks, silica, clays, kaolin, metal salts and oxides, etc.

All of these fillers, however, tend to seriously (and adversely) affect those electrical characteristics which are influenced by the ambient humidity.

In order to retain the reinforcing characteristics and at the same time to render the mixtures easily processable, certain compositions have been proposed which can be vulcanized with peroxides and sulfur, such compositions comprising a copolymer of ethylene with an alpha-olefin, a polymer containing a vinyl unsaturation, and a "white" mineral filler, possibly with the addition of lead and zinc soaps.

The products obtained from these mixtures exhibit good electrical characteristics which render them suitable for use wherein average voltages are encountered. However, such products are not suitable in high voltage applications.

We have now found that the desired effects of reinforcing and of good processability, for the production of manufactured articles for electrical use, can be obtained (while maintaining unaltered the very good electrical characteristics of the starting copolymers, thus making it possible to use the manufactured articles in fields of high voltages) by incorporating in a mixture containing an ethylene-alpha-olefin copolymer and vulcanizing agents, an organic composition comprising a polymer containing a vinyl unsaturation and a polydivinylbenzene (obtained by the free radical-initiated polymerization of monomeric divinylbenzene containing dissolved therein the polymer containing the vinyl unsaturation).

The present invention therefore provides a vulcanizable composition comprising an ethylene-alpha-olefin copolymer containing incorporated therein the polydivinylbenzene polymerization product obtained by polymerizing monomeric divinyl benzene containing dissolved therein a polymer containing a vinyl unsaturation.

The vulcanizable compositions of this invention are characterized by the presence (in an amount from about 10 to 50% by weight based on the copolymer) of a uniformly dispersed organic composition of divinylbenzene polymers and of conjugated diolefin polymer or copolymer.

Another aspect of the invention provides vulcanized manufactured articles, obtained from the aforedescribed compositions, which articles are suitable for use wherein high voltages are encountered and which have good mechanical characteristics and are processable using the conventional machinery of the rubber industry.

The organic composition of polydivinylbenzene and polymer or copolymer of a conjugated diolefin can be obtained by dissolving the diolefin polymer or copolymer in monomeric divinylbenzene and then subjecting the solution to thermal polymerization or to free radical polymerization by the action of one of the common initiators. More particularly, it has been found that heating to from about 130 to 170° C. is sufficient to promote polymerization. In order to decrease the viscosity of the solution, the mixture to be polymerized can be further diluted with a hydrocarbon solvent such as xylene, tetrahydronaphthalene, decahydronaphthalene, etc.

After polymerization, the resulting product is subjected to steam distillation in order to remove the solvent, if any, and the monomer residues, and is then dried.

A white greasy product, partially soluble in hydrocarbons and completely compatible with ethylene-alpha-olefin copolymers, is thus obtained.

The polymer containing vinyl unsaturation desirably comprises a polymeric material obtained from conjugated diolefins, such polymeric material having a 1,2- or 3,4-enchainment and being obtained by means of a catalyst of an alkali metal, e.g., sodium- or lithium-catalyzed polybutadiene, 1,2- or 3,4-polyisoprene, copolymers of diolefins with styrene or its homologues, more particularly, butadiene-styrene rubber (S. B. R.), etc.

The organic composition of polymer containing a vinyl unsaturation and divinylbenzene may be within a composition range varying from about 20% to 80% by weight of polymer and correspondingly from about 80% to 20% by weight divinylbenzene in the mixture to be polymerized.

The vulcanizable compositions of the present invention do not require further additions of inorganic fillers in order to render them easily processable and of the desired mechanical properties.

Because of the absence of any mineral filler, one obtains high electrical characteristics, which characteristics are practically the same as those of the copolymer per se. This is so for copolymer mixtures containing up to about 50% of organic composition.

On the other hand, very satisfactory characteristics as regards reinforcing and processability are obtained with mixtures containing as little as about 10% of the organic composition. Thus, a preferred composition range for the mixture is from 10 to 50% of the organic composition and about 90 to 50% of copolymer.

Of course, to the mixture of ethylene-alphaolefin copolymer and the organic composition there can be added plasticizers, antioxidants, and other conventional additives, provided that these do not alter the favorable electrical characteristics of the vulcanized products and do not interfere with the vulcanizing agents.

Suitable vulcanizing agents include organic peroxides, with or without sulfur: e.g., tertiary alkylperoxides such as di-tertiary butyl peroxide; aroyl peroxides such as dibenzoyl peroxide; diaralkyl peroxides such as di-cumyl peroxide; mixed alkyl-aralkyl peroxides such as tertiary butyl cumyl peroxide; possibly with some of the hydrogens substituted by halogen; and diperoxides.

The amount of peroxide in the vulcanization mixtures is desirably from about 0.1 to 10% by weight of the copolymer. The amount of sulfur is generally from about 0.1 to 3 gram atoms per mole of peroxide, and preferably is from about 0.5 to 1.5 gram atoms per mole of peroxide.

The vulcanization of the compositions of this invention is carried out by heating to a temperature of from about 120 to 220° C., and preferably from about 140 to 180° C.

Our invention will be further illustrated by the following examples. All parts are by weight unless otherwise stated.

EXAMPLE A.—PREPARATION OF ORGANIC COMPOSITION

The following preparation is obtained using Plasticator 32 sodium polybutadiene (trademark of Bunawerte Huls, and used to indicate a sodium polybutadiene having a molecular weight of from 9,000 to 30,000 and a structure of 1,4-enchained for 35% and 1,2-enchained for 65%) and divinylbenzene in the initial proportions of 40% and 60%, respectively.

300 g. of Plasticator 32 are dissolved in 1000 cc. xylene in a beaker and are then introduced, together with 450 g. of divinylbenzene, into a flask provided with a reflux condenser and an agitator.

The flask is immersed in a Vaseline oil heating bath.

When the inner temperature of the flask reaches 154° C. the polymerization of the divinylbenzene commences. After a short initial clouding of the vigorously agitated solution, an almost instantaneous precipitation takes place. The vigorous agitation is continued for about 5 minutes. A horizontal condenser is substituted for the reflux condenser and then xylene is removed by steam distillation.

The residue is dried in an over under vacuum at about 80° C. until a constant weight is reached.

The final product is a friable greasy powder, partially soluble in hydrocarbons.

*Example 1*

The organic composition described above was used as a filler for an ethylene-propylene copolymer (containing about 45 mole percent of ethylene and having a Mooney viscosity (ML 1+4) at 100° C. of 45), the mixture being vulcanized with cumyl peroxide in a press at 165° C. for 30 minutes.

The various mixtures reported in Table 1 were subjected to tests for determining extrudability (Garvey Die index) and various mechanical characteristics. The data, together with the composition of the various mixtures, are reported in Table 1.

The mixtures reported in Table 1 were also subjected to tests for determining their resistance to ozone in a room with considerable ozone concentration (400 p.p.m.).

These ozone-resistance tests were compared with those of other notoriously ozone-resistant rubbers, i.e., butyl rubber, polychloroprene, silicones, and chlorosulphonated polyethylene. The behavior (i.e., ozone resistance) of the ethylene-propylene and ethylene-butene copolymers was much better than that of either butyl rubber or polychloroprene and was equivalent to that of both silicones and chlorosulfonated polyethylene, both of which are very expensive.

TABLE 1

| Mixture | A | B | C | D | E | F | G | H | I |
|---|---|---|---|---|---|---|---|---|---|
| Ethylene-propylene copolymer | 100 | 100 | 100 | 100 | 100 | 100 | 100 | 100 | 100 |
| Organic composition | | 10 | 20 | 30 | 40 | 50 | 60 | 80 | 100 |
| Cumyl peroxide | 2 | 2 | 2 | 2 | 2 | 2 | 2 | 2 | 2 |
| Sulfur | | | | | | | | | |
| Mooney viscosity, ML (1+4), 100° C | 45 | 41 | 44 | 50 | 52 | 54 | 56 | 60 | 69 |
| Garvey Die Index | 8 | 10 | 11 | 12 | 14 | 15 | 16 | 16 | 16 |
| Tensile strength, kg./cm.$^2$ | 15 | 40 | 60 | 67 | 70 | 72 | 90 | 97 | 107 |
| Elongation at break, percent | 550 | 350 | 290 | 250 | 220 | 180 | 150 | 98 | 10 |
| Elongation, kg./cm.$^2$ | 8 | 8 | 13 | 26 | 30 | 43 | 73 | | |
| Permanent set, percent | 228 | 10 | 11 | | | | | | |
| Tear strength, kg./cm.$^2$ | 6 | 11 | 16 | 23 | 25 | 31 | 50 | 34 | |

*Example 2*

Using mixture E of Table 1, a cable containing a copper conductor with a cross-section of 125 mm.$^2$ and having an insulation thickness of 11 mm. was extruded and then vulcanized in an autoclave for 2 hours at 165° C.

An air blister was purposely made in the insulating material so as to have an ionization voltage of 8 kv.

This cable was then subjected to an alternating voltage of 60 kv. at 50 cycles. No sign of burning nor of change in the electrical characteristics was observed after use for a number of months.

The following electrical characteristics were also obtained for the vulcanized mixture:

Dielectric rigidity _____ kv./mm__ 35
Insulation constant _____ Mohm×km__ 80,000
Dielectric constant _____ 2.3
Dielectric constant after immersion in water at 75° C. for 14 days _____ 2.6

The dielectric losses were determined at two temperatures, recording the following volumes:

At 25° C. under a voltage of 40 v./mil (1600 v./mm.): tg $\delta$=0.003
At 100° C. under a voltage of 40 v./mil (1600 v./mm.): tg $\delta$=0.006

Example 3

An organic composition was prepared by varying the amounts of the components therein. The polymerization procedure was the same as described in Example 1. However, the initial amounts of Plasticator 32 and of monomeric divinylbenzene to form the organic composition were 20 and 80%, respectively.

The products obtained were white, amorphous, and friable, and had a consistency corresponding to that of the product described in Example 1.

This composition was dried and used as a filler for an ethylenepropylene copolymer of the type described in Example 1. The amount of filler was varied as shown in Table 2. The mixtures were vulcanized in a press at 165° C. for 30 minutes and the characteristics were determined.

TABLE 2

| Mixture | A | B | C | D | E |
|---|---|---|---|---|---|
| Ethylene-propylene copolymer | 100 | 100 | 100 | 100 | 100 |
| Organic composition | | 5 | 10 | 20 | 50 |
| Cumyl peroxide | 2 | 2 | 2 | 2 | 2 |
| Sulfur | | | | | |
| Mooney viscosity ML (1+4) 100° C | 45 | 46 | 46 | 46 | 51 |
| Garvey Die Index | 8 | 11 | 12 | 13 | 15 |
| Tensile strength, kg./cm.$^2$ | 15 | 21 | 30 | 40 | 59 |
| Elongation at break, percent | 550 | 460 | 460 | 450 | 390 |
| Modulus at 300%, elongation, kg./cm.$^2$ | 8 | 11 | 14 | 30 | 44 |
| Permanent set, percent | 22 | 16 | 16 | 16 | 18 |
| Tear resistance, kg./cm.$^2$ | 6 | 9 | 10 | 18 | 26 |

Example 4

In this example, an organic composition in which the initial amounts of Plasticator 32 and of monomeric benzene were 60 and 40%, respectively, was prepared using the same polymerization technique as described in Example 1.

The product obtained is in the form of yellow rubbery swollen clots. After drying, it is used as a filler for various mixtures as reported in Table 3 along with the characteristics of the vulcanizates (vulcanization in a press at 165° C. for 30 minutes).

TABLE 3

| Mixture | A | B | C | D | E |
|---|---|---|---|---|---|
| Ethylene-propylene copolymer | 100 | 100 | 100 | 100 | 100 |
| Organic Composition | | 5 | 10 | 20 | 50 |
| Cumyl peroxide | 2 | 2 | 2 | 2 | 2 |
| Sulfur | | | | | |
| Mooney viscosity ML (1+4) 100° C | 45 | 42 | 38 | 30 | 22 |
| Garvey Die Index | 8 | 10 | 11 | 12 | 14 |
| Tensile strength, kg./cm.$^2$ | 15 | 33 | 50 | 71 | 85 |
| Elongation at break, percent | 550 | 450 | 400 | 300 | 170 |
| Modulus at 100% elongation, kg./cm.$^2$ | 8 | 6 | 8 | 18 | 72 |
| Permanent set, percent | 22 | | | | 14.5 |
| Tear strength, kg./cm.$^2$ | 6 | 10 | 12 | 20 | 56 |

Example 5

The organic composition was obtained with initial amounts of Plasticator 32 and of monomeric divinylbenzene of 80 and 20%, respectively, the other polymerization conditions being the same as described in Example 1.

A slower precipitation at about 156° C. was observed. The product is obtained in the form of highly swollen rubbery yellow clots.

After drying as described in Example 1, this product was used as a filler for ethylene-propylene copolymers of the type heretofore described. The compositions of the mixtures and the characteristics of the crude and of the vulcanized products (30' at 165° C.) are reported in Table 4.

TABLE 4

| Mixture | A | B | C | D | E |
|---|---|---|---|---|---|
| Ethylene-propylene copolymer | 100 | 100 | 100 | 100 | 200 |
| Organic composition | | 5 | 10 | 20 | 50 |
| Cumyl peroxide | 2 | 2 | 2 | 2 | 2 |
| Sulfur | | | | | |
| Mooney viscosity ML (1+4) at 100° C | 45 | 38 | 34 | 24 | 9 |
| Garvey Die Index | 8 | 10 | 11 | 12 | 14 |
| Tensile strength, kg./cm.$^2$ | 15 | 31 | 48 | 54 | 63 |
| Elongation at break, percent | 550 | 450 | 390 | 315 | 205 |
| Modulus at 100%, kg./cm.$^2$ | 8 | 6 | 7 | 12 | 49 |
| Permanent set, percent | 22 | 16 | 13 | 13.5 | |
| Tear strength, kg./cm.$^2$ | 6 | 9 | 12 | 16 | 46 |

Example 6

Using mixture E of Table 1, a small cable with a single tinned copper wire having a diameter of 0.9 mm. was extruded. On the sheath, separated from the conductor, the following mechanical characteristics were determined:

Tensile strength _____ kg./cm.$^2$__ 75
Elongation at break _____ percent__ 180

On this cable the values of dielectric constant and of dielectric losses were determined according to the IPCEA specifications for butyl rubber, with alternating current at 50 cycles, after immersion of such cable in water at 75° C. for the times reported:

After 1 day:
  Dielectric constant measured at—
    40 v./mil ($\approx$1600 v./mm.)=2,28; tg $\delta$=0.0030
    80 v./mil ($\approx$3200 v./mm.)=2.28; tg $\delta$=0.0035
After 7 days:
  Dielectric constant measured at—
    40 v./mil ($\approx$1600 v./mm.)=2.54; tg $\delta$=0.0036
  Dielectric constant measured at—
    80 v./mil ($\approx$3200 v./mm.)=2.55; tg $\delta$=0.0036
After 14 days:
  Dielectric constant measured at—
    40 v./mil ($\approx$1600 v./mm.)=2.52; tg $\delta$=0.0030
    80 v./mil ($\approx$3200 v./mm.)=2.52; tg $\delta$=0.0034

The insulation constant, $Ki$=75,000 M$\Omega$ km., remains constant even after immersion for 2 days in water at 75° C.

Using the same mixture, some sheets, 120 x 120 x 2 mm., were pressed and vulcanized in a press at 165° C. for 30 minutes. The variations in the dielectric constant and in the dielectric losses as a function of temperature were as follows:

At 15° C.:
  Dielectric constant measured at—
    40 v./mil ($\approx$1600 v./mm.)=2.25; tg $\delta$=0.0067
  Dielectric constant measured at—
    80 v./mil ($\approx$3000 v./mm.)=2.28; tg $\delta$=0.0069
At 30° C.:
  Dielectric constant measured at—
    40 v./mil ($\approx$1600 v./mm)=2.30; tg $\delta$ =0.0064
  Dielectric constant measured at—
    80 v./mil ($\approx$3200 v./mm.)=2.30; tg $\delta$=0.0068
At 50° C.:
  Dielectric constant measured at—
    40 v./mil ($\approx$1600 v./mm.)=2.44; tg $\delta$=0.0057
  Dielectric constant measured at—
    80 v./mil ($\approx$3200 v./mm.)=2.44; tg $\delta$=0.0066

At 100° C.:
Dielectric constant measured at—
  40 v./mil ($\simeq$1600 v./mm.)=2.44; tg $\delta$=0.0057
Dielectric constant measured at—
  80 v./mil ($\simeq$3200 v./mm.)=tg $\delta$=0.0085

On sheets prepared from the same mixture there was determined the water absorption, with the following results:

Specimen immersed in water at 100° C. for 24 hours: weight increases=1.4 mg./cm.$^2$.
Specimen immersed in water at 70° C. for 7 days: weight increase=1.6 mg./cm.$^2$.

In order to evaluate the resistance to ionization, a vulcanized sheet having a thickness of 3 mm. was prepared from the above mixture. A notch about 1 mm. deep was made in the surface of this sheet. The sheet, after stretching about 5%, was placed between two electrodes so as to form a mixture-air dielectric which was subjected to a potential difference of 12 kv. at 50 hg. Under these conditions, no perforation had occurred after 15 days.

*Example 7*

A mixture formed of:                           Parts by
                                                weight
Ethylene-butene copolymer (ethylene molar content=60%; Mooney viscosity ML (1+4) at 100° C. of 45) _____ 100
Organic composition _____ 50
Cumyl peroxide _____ 2 in which the organic composition consists of Plasticator 32 and divinylbenzene (weight ratio=40:60, respectively), is vulcanized in a press at 165° C. during 30 minutes in the form of a sheet.

The mechanical characteristics are:

Tensile strength _____kg./cm.$^2$__ 70
Elongation at break, percent _____ 200
Modulus at 100% elongation _____kg./cm.$^2$__ 38
Residual elongation, percent _____ ---
Tear strength _____kg./cm.$^2$__ 28

The electrical characteristics are:

Dielectric rigidity _____kv./mm__ 34
Insulation constant _____M$\Omega$/km__ 70,000
Dielectric constant _____ 2.25
Dielectric constant after immersion in water at
  65° C. for 14 days _____ 2.55

The dielectric losses were determined at two temperatures, recording the following values:
At 25° C. under a voltage of 40 v./mil—
  ($\simeq$1600 v./mm.): tg $\delta$=0.0031
At 100° C. under a voltage of 40 v./mil—
  ($\simeq$1600 v./mm.): tg $\delta$=0.0062

Variations can of course be made without departing from the spirit of this invention.

Having thus described the invention, what is desired to be secured and claimed by Letters Patent is:

1. A vulcanizable composition comprising a saturated amorphous copolymer of ethylene with a different alpha-mono-olefin and, as a vulcanizing agent, an organic peroxide, said composition also containing uniformly dispersed therein a polymeric filler obtained by the free radical polymerization of divinyl-benzene in the presence of a polymer of a conjugated diolefin, said polymer being selected from the group consisting of sodium and lithium polybutadiene having prevailingly 1,2-bonding, 1,2-polyisoprene, 3,4-polyisoprene, and a copolymer of butadiene and styrene, the amount of said polymeric filler being from about 10 to 50% by weight of the mixture of said copolymer and said polymeric filler.

2. The composition of claim 1 wherein said polymer of said conjugated diolefin is a homopolymer.

3. The composition of claim 1 wherein said polymer of said conjugated diolefin is a copolymer.

4. The composition of claim 1 wherein said vulcanizing agent includes sulfur.

5. The composition of claim 1 wherein said alpha-olefin is propylene.

6. The composition of claim 1 wherein said alpha-olefin is butene.

7. The vulcanizable composition of claim 1 wherein the mixture of divinyl-benzene and polymer of said conjugated diolefin contains from about 20 to 80% by weight of said polymer and correspondingly from about 80 to 20% by weight of said divinyl-benzene.

8. The vulcanizable composition of claim 1 wherein the peroxide is present in an amount of from about 0.1 to 10% by weight of the copolymer and wherein sulfur is present in an amount of from about 0.1 to 3 gram atoms per mole of peroxide.

9. The vulcanizable composition of claim 1 wherein the peroxide is present in an amount of from about 0.1 to 10% by weight of the copolymer and wherein sulfur is present in an amount of from about 0.3 to 1.5 gram atoms per mole of peroxide.

10. A method of effecting vulcanization, this method comprising a homogeneous mixture of a saturated copolymer of ethylene with an alpha-olefin, an organic peroxide, sulfur, and a polymeric filler obtained by the free radical polymerization of divinyl-benzene in the presence of a polymer of a conjugated diolefin, said polymer being selected from the group consisting of sodium and lithium polybutadiene having prevailingly 1,2-bonding, 1,2-polyisoprene, 3,4-polyisoprene, and a copolymer of butadiene and styrene, the amount of said organic filler being from about 10 to 50% by weight of the mixture of said copolymer and said polymeric filler, from about 120 to 200° C.

11. The method of claim 15 wherein said temperature is from about 140 to 180° C.

12. The vulcanized product of claim 1, said product being characterized by high electrical and mechanical properties.

13. Electrical cables whose insulation has been obtained by vulcanization of the composition of claim 1 and being characterized by a high resistance to the corona effect and a high insulating constant.

References Cited by the Examiner
UNITED STATES PATENTS
2,688,009   8/1954   Crouch _____ 260—879

MURRAY TILLMAN, *Primary Examiner.*
D. J. BREZNER, *Assistant Examiner.*